(12) United States Patent
Tozaki et al.

(10) Patent No.: US 11,504,886 B2
(45) Date of Patent: Nov. 22, 2022

(54) MOLDING MACHINE

(71) Applicant: SINTOKOGIO, LTD., Nagoya (JP)

(72) Inventors: Takanobu Tozaki, Toyokawa (JP); Takayuki Komiyama, Toyokawa (JP); Tomohiro Aoki, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 17/172,397

(22) Filed: Feb. 10, 2021

(65) Prior Publication Data

US 2021/0291410 A1 Sep. 23, 2021

(30) Foreign Application Priority Data

Mar. 19, 2020 (JP) .............................. JP2020-049926

(51) Int. Cl.
*B29C 33/38* (2006.01)
(52) U.S. Cl.
CPC ................................ *B29C 33/3842* (2013.01)
(58) Field of Classification Search
CPC ....... B29C 33/3842; B22C 5/12; B22C 15/23; B22C 5/044; B01F 27/88; B01F 27/90; B29B 7/405
See application file for complete search history.

(56) References Cited

U.S. PATENT DOCUMENTS

| | | | | |
|---|---|---|---|---|
| 3,012,977 A | * | 12/1961 | Hutton ................... | B29B 7/7428 521/917 |
| 3,142,477 A | * | 7/1964 | Jouriles ................... | B29B 7/405 521/917 |
| 4,422,772 A | * | 12/1983 | Baumgartner ........ | B01F 27/953 366/331 |
| 4,844,297 A | * | 7/1989 | Smith ................... | B01F 35/881 222/14 |
| 5,209,498 A | | 5/1993 | Colin | |
| 5,261,745 A | * | 11/1993 | Watkins ................ | B01F 27/941 366/250 |
| 6,230,938 B1 | * | 5/2001 | Boers ................... | B65D 47/286 215/322 |
| 2015/0083837 A1 | * | 3/2015 | Thienel ............... | B01F 27/2322 241/65 |

(Continued)

FOREIGN PATENT DOCUMENTS

| | | |
|---|---|---|
| EP | 3626363 A1 | 3/2020 |
| GB | 2349673 A | 11/2000 |

(Continued)

OTHER PUBLICATIONS

U.S. Appl. No. 17/172,389, filed Feb. 10, 2021.

(Continued)

*Primary Examiner* — Leith S Shafi
(74) *Attorney, Agent, or Firm* — Harness, Dickey & Pierce, P.L.C.

(57) ABSTRACT

The present invention includes: a connector unit configured to disconnectably connect an injection container unit and a lid member; and a vertically driving mechanism configured to cause the injection container unit and the lid member to move up and down together when the injection container unit and the lid member are connected together and to cause the lid member to move up and down when the injection container unit and the lid member are not connected together.

4 Claims, 8 Drawing Sheets

(56) References Cited

U.S. PATENT DOCUMENTS

2018/0326381 A1* 11/2018 Bradley ............... B01F 35/718
2018/0326473 A1* 11/2018 Maegawa ............. B22C 19/04
2018/0355982 A1   12/2018 Veto et al.
2021/0276076 A1*  9/2021 Kato .................. B22C 15/08

FOREIGN PATENT DOCUMENTS

JP    2018-192512 A    12/2018
WO    WO-2018211785 A1 * 11/2018 ............. B22C 15/08

OTHER PUBLICATIONS

Sigma, "Glass reactor system," published in public on Aug. 18, 2018, available at https://web.archive.org/web/20180818094433/http://sigmaglassindia.com/products/glass-reactor-system/)(Year: 2018).

DeDietrich, "The Benefits of Glass and Glass-Lined Steel Reactors" (Blog, available at https://www.ddpsinc.corn/blog/benefits-of-glass-and-glass-lined-steel-reactors, published in public on Mar. 29, 2018) (Year: 2018).

U.S. Office Action for corresponding U.S. Appl. No. 17/172,389 dated Mar. 28, 2022.

U.S. Office Action for corresponding U.S. Appl. No. 17/172,389 dated Aug. 17, 2022.

* cited by examiner

MOLDING MACHINE

This Nonprovisional application claims priority under 35 U.S.C. § 119 on Patent Application No. 2020-049926 filed in Japan on Mar. 19, 2020, the entire contents of which are hereby incorporated by reference.

TECHNICAL FIELD

The present invention relates to a molding machine configured to form a mold by injecting a foamed mixed material into a cavity of a heated mold and filling the cavity of the heated mold.

BACKGROUND ART

Figure 9:
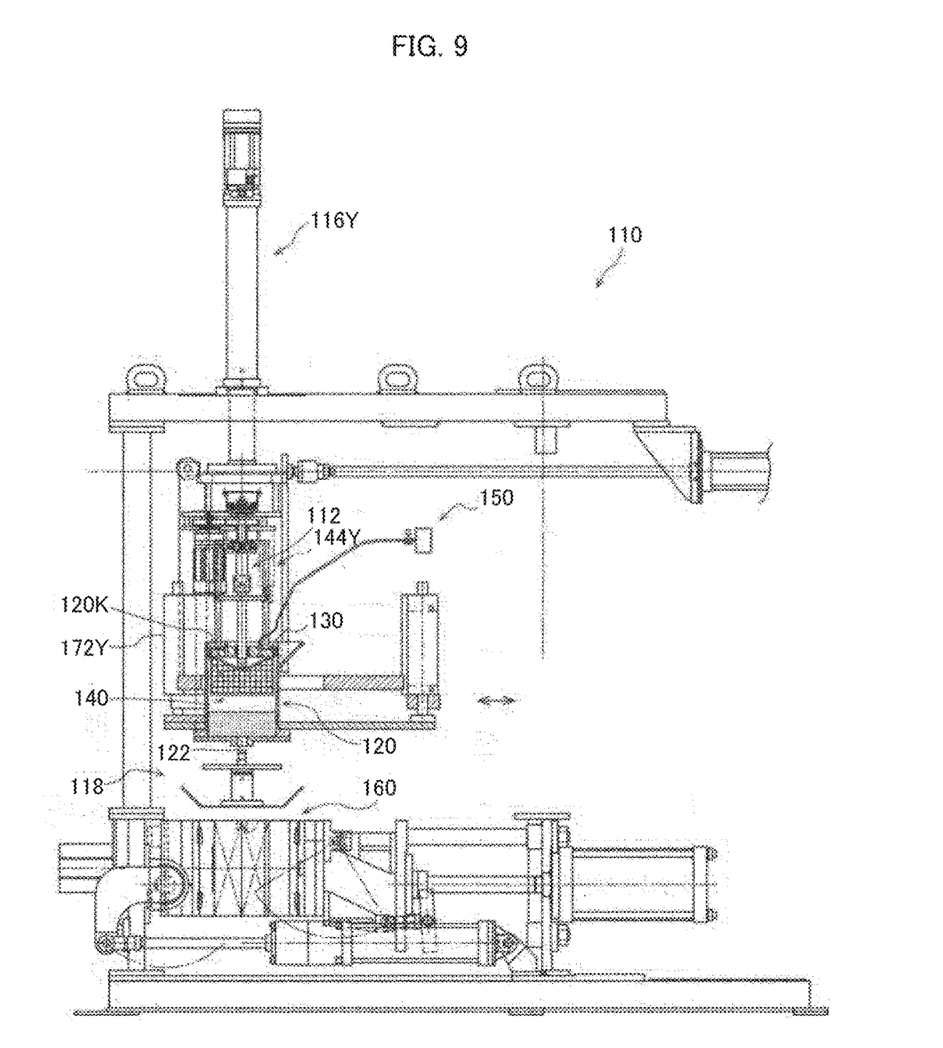
FIG. 9 illustrates a configuration of a conventional molding machine.

In recent years, there has been a proposal to form a mold in the following manner, because such a mold is easily breakable after casting: a water-soluble binder is used as a binding agent to bind aggregate particles; the water-soluble binder is allowed to solidify by evaporating water with heat; and thereby the mold is formed. For example, Patent Literature 1 discloses a molding machine configured such that: a foamed mixture which is a material for the above-mentioned mold is produced; and the foamed mixture is injected by air into a cavity of a mold. A molding machine 100 of Patent Literature 1 illustrated in FIG. 9 includes: a chamber 120 which has, in the bottom thereof, a through-hole 122 through which the material is filled into the cavity; a stopper mechanism 118 which opens and closes the through-hole 122; and a lid member 130 which hermetically closes an opening 120K of the chamber 120. The molding machine 110 further includes: a stirring mechanism 112 provided with a stirring blade 140 in a lower part thereof; and a compressed air supplying mechanism 150 which supplies compressed air into the chamber 120 when the foamed mixture is filled into the cavity of the mold 160 through the through-hole 122. The molding machine 110 further includes: a cylinder 172Y configured to cause the chamber 120 to move vertically; a servo cylinder 116Y configured to cause the lid member 130 to move vertically; and a servo cylinder 144Y configured to cause the stirring blade 140 to move vertically. That is, the molding machine 110 includes drive systems specifically for the respective constituent elements which move vertically.

CITATION LIST

Patent Literature

[Patent Literature 1]
Japanese Patent Application Publication, Tokukai, No. 2018-192512

SUMMARY OF INVENTION

Technical Problem

The molding machine of Patent Literature 1 has a complex configuration because there are drive systems specifically for the respective constituent elements which move vertically. Furthermore, these constituent elements which move vertically are controlled independently of each other. Therefore, cycle time (time from the start of mixing to the end of injection) is relatively long. For such reasons, the molding machine of Patent Literature 1 still has room for simplification of the configuration and a reduction in the cycle time (time from the start of mixing to the end of injection).

In view of above, an object of an aspect of the present invention is to provide a molding machine that is simpler in configuration than conventional apparatuses and that achieves a shorter cycle time (time from the start of mixing to the end of injection) than conventional apparatuses.

Solution to Problem

In order to attain the above object, a molding machine in accordance with an aspect of the present invention includes: an injection container unit configured such that a foamed mixed material is injected from the injection container unit into a cavity of a mold through an ejection port; a lid member configured to open and close an opening at a top of the injection container unit; a vertically driving mechanism configured to cause the lid member to move up and down along a depth direction of the injection container unit; and a connector unit configured to disconnectably connect the injection container unit and the lid member.

Advantageous Effects of Invention

An aspect of the present invention makes it possible to provide a molding machine that is simpler in configuration than conventional apparatuses and that achieves a shorter cycle time than conventional apparatuses.

DESCRIPTION OF EMBODIMENTS

The following description will discuss a molding machine in accordance with an embodiment of the present invention with reference to FIGS. 1 to 8.

(1) Overview of Molding Machine 1

Figure 1:
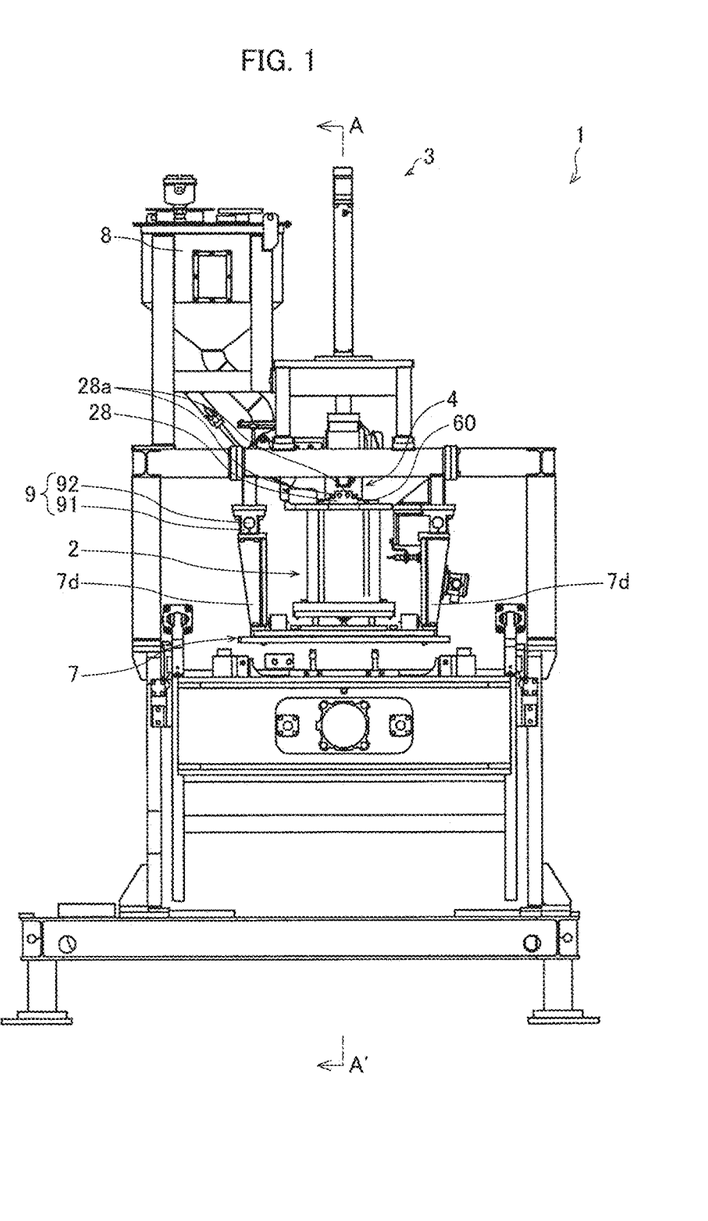
FIG. 1 is an elevational view of a molding machine in accordance with an embodiment of the present invention.
Figure 2:
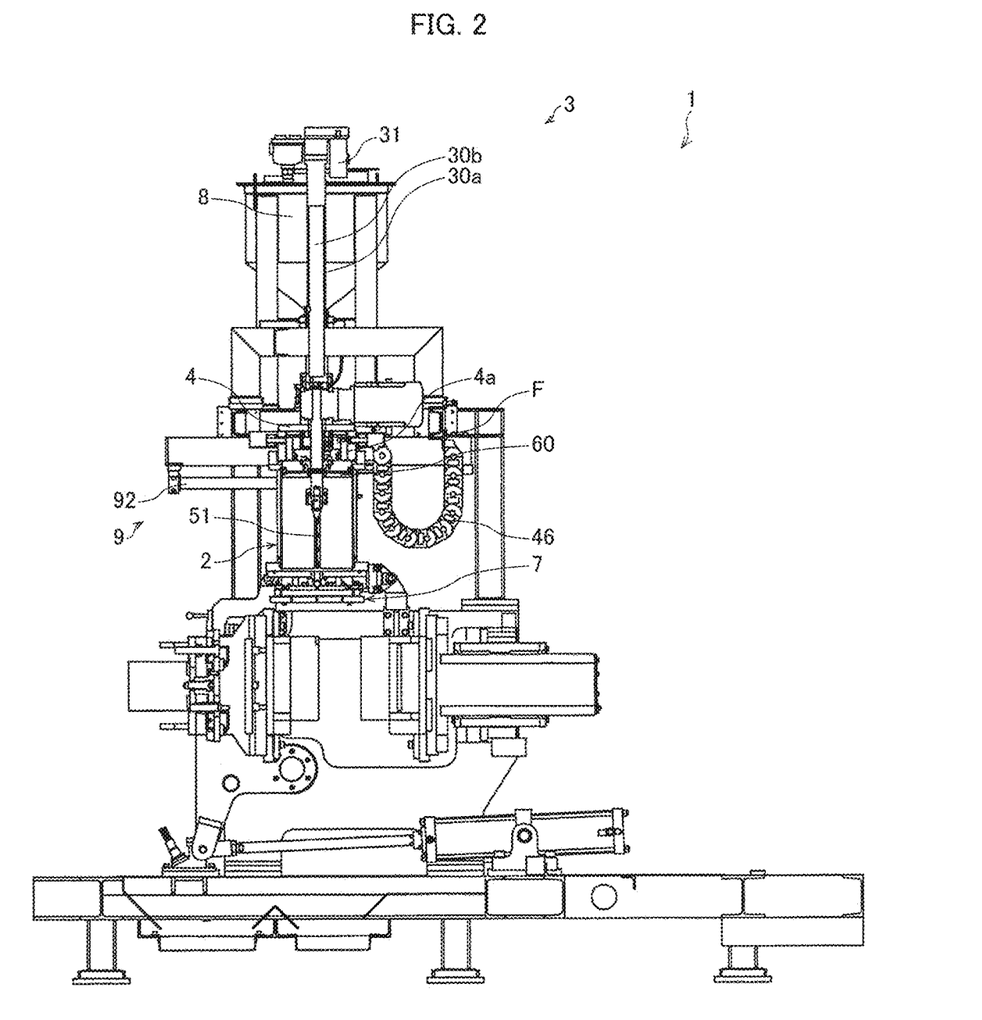
FIG. 2 is a cross-sectional view of the molding machine taken along line A-A' in FIG. 1.
Figure 3:
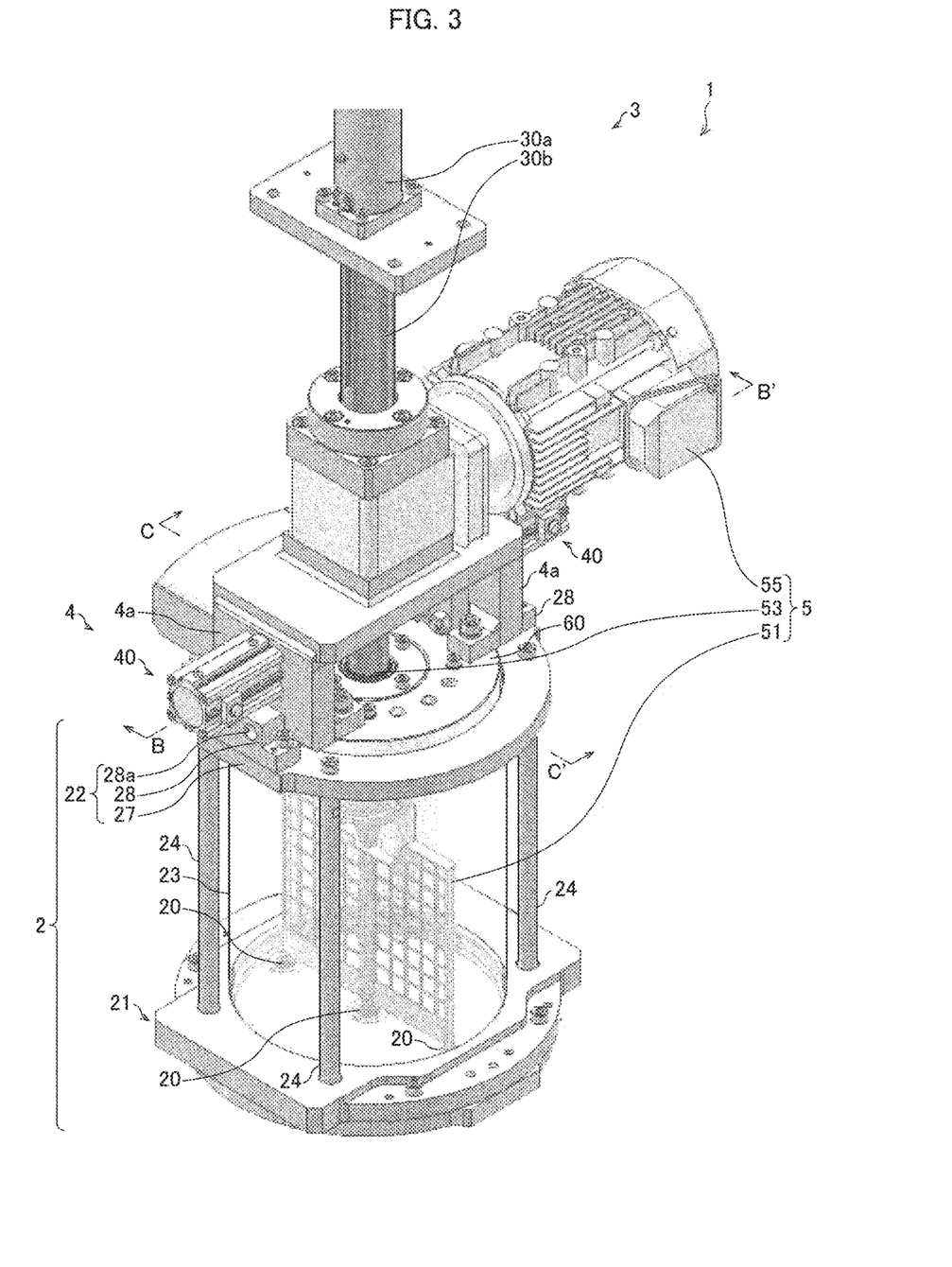
FIG. 3 is a perspective view illustrating an injection container unit and its vicinity of the molding machine in accordance with an embodiment of the present invention.
Figure 4:
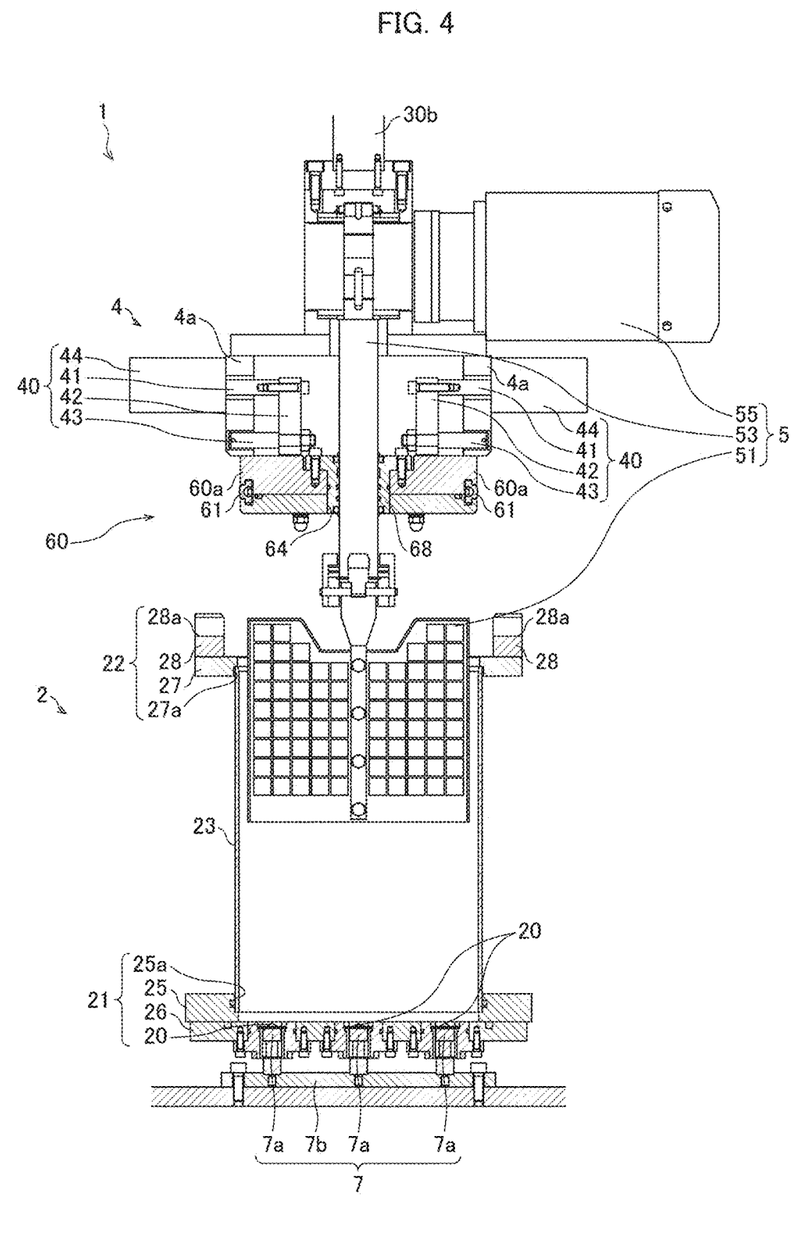
FIG. 4 is a cross-sectional view of the injection container unit and its vicinity of the molding machine illustrated in FIG. 1.

FIG. 1 is an elevational view illustrating an overall configuration of a molding machine 1 in accordance with the present embodiment. FIG. 2 is a cross-sectional view of the molding machine 1 taken along line A-A' in FIG. 1. FIG. 3 is a perspective view illustrating an injection container unit 2 and its vicinity of the molding machine 1. FIG. 4 is a cross-sectional view of the molding machine 1 taken along line B-B' in FIG. 3. The molding machine 1 can be used in a process of forming a mold by injecting a material into a cavity of a mold and filling the cavity of the mold. The molding machine 1 can be used especially suitably in a process of forming a core with use of, as a molding material, a foamed mixed material obtained by mixing particulate aggregate, a water-soluble binder, a surfactant, and water.

Figure 6:
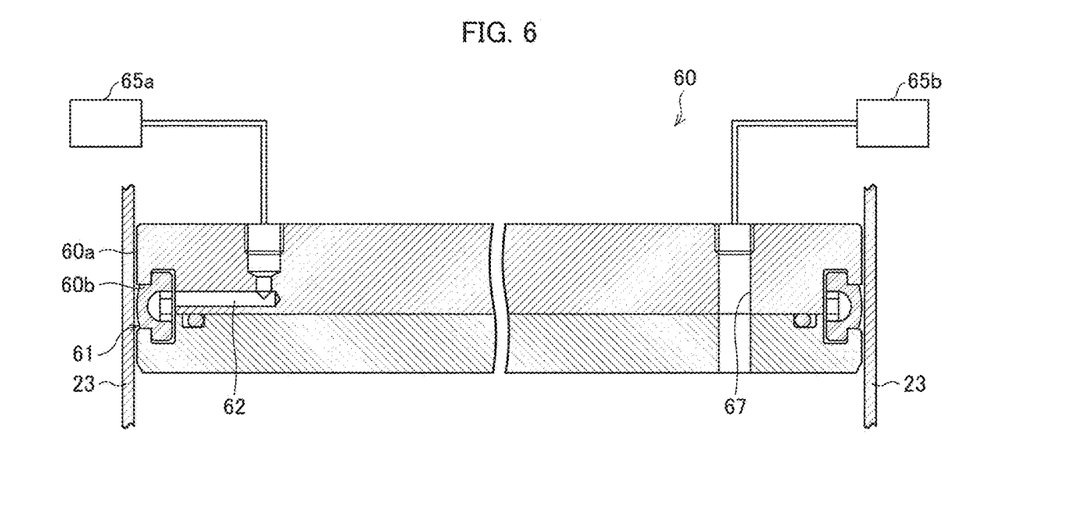
FIG. 6 is a cross-sectional view of a sealing body of the molding machine illustrated in FIG. 1.

The molding machine 1 includes the injection container unit 2. The molding machine 1 produces a foamed mixed material with use of a stirring blade 51 (FIG. 2) in the injection container unit 2 and ejects the produced foamed mixed material from the injection container unit 2. The molding machine 1 supplies air (e.g., compressed air) to the headspace of the injection container unit 2 to thereby eject the foamed mixed material from the injection container unit 2. The molding machine 1 further includes: a lid member 60 configured to open and close the opening at the top of the injection container unit 2; and an ejection air supply section 65*b* (FIG. 6). The molding machine 1 also includes drive systems for carrying out operations from mixing to injection.

With regard to the drive systems, the molding machine 1 includes: a vertically driving mechanism 3 configured to cause the lid member 60 to move up and down along the depth direction of the injection container unit 2; and a connector unit 4 configured to disconnectably connect the injection container unit 2 and the lid member 60. In a case where the injection container unit 2 and the lid member 60 are connected together in one unit by the connector unit 4, the vertically driving mechanism 3 causes the injection container unit 2 to move up or down (along the depth direction) together with the lid member 60. On the contrary, in a case where the injection container unit 2 and the lid member 60 are not connected together by the connector unit 4 disconnected from each other), the vertically driving mechanism 3 causes the lid member 60 to move up or down without causing the injection container unit 2 to move up or down. As such, in a case where the injection container unit 2 needs to be moved up or down, the molding machine 1 is capable of causing the injection container unit 2 to move up or down with use of the vertically driving mechanism 3 by connecting the injection container unit 2 with the lid member 60 by the connector unit 4. In other words, the molding machine 1 is configured to cause the injection container unit 2 to move up and down with use of the vertically driving mechanism 3 which is configured to cause the lid member 60 to move up and down. The molding machine 1 does not include a driving mechanism specifically for causing the injection container unit 2 to move up and down. This makes it possible to simplify the configuration of the molding machine 1 compared to conventional molding machines which include the driving mechanism specifically for causing an injection container unit to move up and down. In addition, in a case where there are driving mechanisms for vertical movements specifically for respective constituent elements which need to be moved up and down, such vertical movements should be carried out in consideration of the relative positions of the constituent elements. This necessitates a complex control such as controlling the relative positions of the driven constituent elements. In this regard, in the present embodiment, the vertically driving mechanism 3 is used as a driving mechanism for vertical movements of both the lid member 60 and the injection container unit 2. This eliminates the risk of interference and reduces the likelihood of stoppage caused by a breakdown of assumptions. It is also possible to shorten the cycle time.

(2) Details of Molding Machine 1

Figure 7:
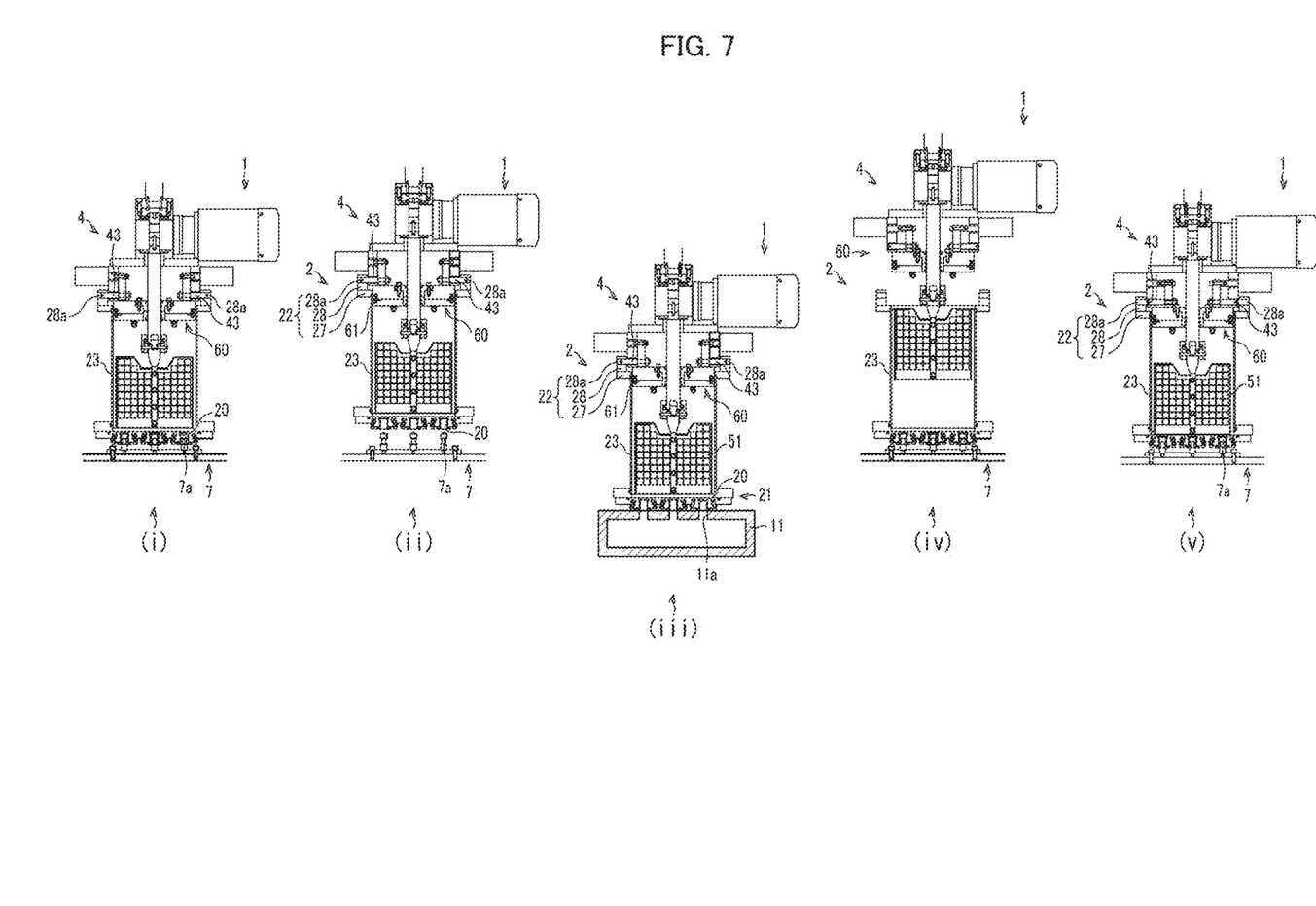
FIG. 7 schematically illustrates an example of how the molding machine illustrated in FIG. 1 operates.

The following description will discuss the molding machine 1 in detail. The molding machine 1 includes the injection container unit 2, the lid member 60, the vertically driving mechanism 3, and the connector unit 4. The molding machine 1 further includes the stirring mechanism 5, a stopper mechanism 7 (FIG. 4), a driving mechanism 9 (FIGS. 1 and 2), and a mold 11 (FIG. 7).

The injection container unit 2 is a container in which materials (molding material) are mixed to produce a foamed mixed material and which is configured to store the produced foamed mixed material until the foamed mixed material is ejected. The injection container unit 2 includes: a lower unit 21 which has one or more ejection ports 20; an upper unit 22 which is located opposite the lower unit 21; and a lateral part 23 which is present between the lower unit 21 and the upper unit 22 and which is composed of a transparent material. The lateral part 23 is in the form of a cylinder, and the opening at the bottom thereof is sealed by the lower unit 21. The lower unit 21 thereby serves as the base of the container, and the lateral part 23 is capable of accommodating the foamed mixed material therein. As illustrated in FIG. 1, the injection container unit 2 includes a plurality of struts 24 which are provided outside the lateral part 23 and which connect the lower unit 21 and the upper unit 22.

As illustrated in FIG. 4, the lower unit 21 includes: a lower flange 25 which has a shape projecting outward from the vicinity of the outer periphery of the lateral part 23; and an ejection plate body 26 present below the lower flange 25. The lower flange 25 has an opening 25*a* whose diameter is slightly greater than the outer diameter of the lateral part 23. The lower flange 25 is connected to the lateral part 23 by a bottom end portion of the lateral part 23 being fitted into the opening 25*a*. The ejection plate body 26 is connected to the lower surface of the lower flange 25, and the upper surface of the ejection plate body 26 is partially exposed inside the container. This exposed portion constitutes the upper surface of the base of the container of the injection container unit 2. The ejection ports 20 are through-holes in the ejection plate body 26. The number of the ejection ports 20 is, for example, three, as illustrated in FIG. 4. The number of the ejection ports 20 is not limited to three. The ejection ports 20 may each be provided with a valve structure which prevents the foamed mixed material from leaking out. The valve structure may be, for example, a well-known valve structure made of rubber.

The lower unit 21 has a double-layer structure, and therefore can have a certain degree of thickness. The lower unit 21 thus contributes to improving the rigidity of the injection container unit 2. The lower flange 25 and the ejection plate body 26 are each preferably composed of a material which has an alkali resistance and from which mixed sand is easily detached. The lower flange 25 and the ejection plate body 26 can each be composed of, for example, a metal such as stainless steel, a fluorocarbon resin such as PTFE, or the like. In a case where the lower flange 25 and the ejection plate body 26 are each composed of a metal, the rigidity is further improved. The lower flange 25 and the ejection plate body 26 may be composed of the same material or may be composed of different materials.

As illustrated in FIGS. 3 and 4, the upper unit 22 includes an upper flange 27 which has a shape projecting outward from the vicinity of the outer periphery of the lateral part 23. As illustrated in FIG. 4, the upper flange 27 has an opening 27a (opening at the top) whose diameter is slightly greater than the outer diameter of the lateral part 23. The upper flange 27 is connected to the lateral part 23 by a top end portion of the lateral part 23 being fitted into the opening 27a. The upper flange 27 can be composed of a metal such as stainless steel or a fluorocarbon resin such as PTFE. Note, however, that the material for the upper flange 27 is not limited to those mentioned above. The upper flange 27 has a certain degree of thickness, and thereby contributes to improving the rigidity of the injection container unit 2. In a case where the upper flange 27 is composed of a metal, the rigidity is further improved.

The upper flange 27 of the upper unit 22 has clamping bushings 28 connected to the upper surface thereof. The clamping bushes 28 are located at two positions opposite each other with the central axis of the injection container unit 2 between them, and each have one or more holes 28a for insertion of one or more clamping pins 43 (described later). The clamping bushes 28 and the clamping pins 43 (described later) constitute a part of the connector unit 4. The clamping bushes 28 may be composed of the same material as that for the upper flange 27 or a different material from that for the upper flange 27.

As illustrated in FIG. 3, the struts 24 are connected to the lower unit 21 and the upper unit 22. The struts 24 are preferably each composed of a metal, as with the lower unit 21 and the upper unit 22. With this configuration, the struts 24, together with the lower unit 21 and the upper unit 22, can contribute to improving the rigidity of the injection container unit 2. Furthermore, the struts 24 keep the distance between the lower unit 21 and the upper unit 22 constant. In the present embodiment, the number of the struts 24 is four in total, and these four struts 24 are provided along the outer circumference of the lateral part 23 and are equally spaced apart from each other. Note that the number of the struts 24 is not limited to four.

The lateral part 23 is fixed to the lower unit 21 and the upper unit 22, and constitutes the side wall of the container for accommodating the foamed mixed material. The lateral part 23 is composed of a transparent material. This makes it possible to clearly observe the inside of the injection container unit 2. The observation makes it possible to check changes and the amount of mixed sand, and also possible to check whether or not there are deposits that should be removed during cleaning of the injection container unit 2 and check whether the deposits remain or not during the cleaning. It is also possible to check whether or not sealing with a sealing body 61 (described later, e.g., inflatable seal) has been done. The transparent material can be a transparent thermoplastic resin (so-called "plastic"). In particular, the transparent material is preferably selected from the group consisting of rigid plastics such as acrylic resin, polycarbonate, vinyl chloride, and polystyrene.

The lateral part 23 need only be strong enough to withstand the weight of the accommodated foamed mixed material and an internal pressure applied during injection and filling. The rigidity of the injection container unit 2 can be achieved by the lower unit 21, the upper unit 22, and the struts 24. Therefore, the lateral part 23 can be made relatively thin, provided that the lateral part 23 can withstand the internal pressure.

The lid member 60 has a circumferential surface 60a which is configured to face the inner circumferential surface of the upper unit 22-side opening of the injection container unit 2. The circumferential surface 60a is provided with the sealing body 61.

The sealing body 61 is capable of deforming radially (in radial directions which are directions going away from the center of the lid member 60 toward the circumferential surface 60a). When the sealing body 61 is deformed radially, a ridge of the sealing body 61 makes close contact with the inner circumferential surface of the injection container unit 2 and thereby hermetically closes the opening at the top of the injection container unit 2. In other words, when the sealing body 61 is in undeformed state, there is a gap between the sealing body 61 and the inner circumferential surface of the injection container unit 2. The sealing body 61 is deformed by sending, under pressure, air from a sealing air supply section 65a to a hollow in the sealing body 61. When the opening at the top of the injection container unit 2 is closed by the lid member 60 and the sealing body 61 is brought into close contact with the inner circumferential surface of the injection container unit 2, the inside of the injection container unit 2 is brought into a hermetically closed state. While the inside of the injection container unit 2 is in the hermetically closed state, when air is sent under pressure by the ejection air supply section 65b into the injection container unit 2, the foamed mixed material in the injection container unit 2 is pressed by compressed air and is ejected through the ejection ports 20. When air stops being supplied to the hollow in the sealing body 61, the sealing portion 61a regains its original state (state before the inflation) and detaches from the inner circumferential surface of the injection container unit 2. The sealing body 61 deforms (inflates) and hermetically closes the injection container unit 2 also during mixing to prevent or reduce the shaking of the injection container unit 2 resulting from mixing. Note that the configuration of the lid member 60 is not limited to that described above, provided that the lid member 60 is configured to be capable of closing the opening at the top of the injection container unit 2.

The lid member 60 has a stirring shaft insertion hole 64 having a bearing 68 through which the stirring shaft 53 (having the stirring blade 51 at the lower end thereof) is inserted (FIG. 4). The ascending or descending movement of the lid member 60 and the ascending or descending movement of the stirring shaft 53 and the stirring blade 51 are together driven and controlled by the vertically driving mechanism 3 (FIG. 2).

The sealing air supply section 65a supplies air to the foregoing hollow in the sealing body 61. Specifically, the sealing air supply section 65a is connected to an end of a flow path 62 in the lid member 60, and, in the step of ejecting the foamed mixed material from the injection container unit 2 through the ejection ports 20, supplies air to the foregoing hollow in order to cause the sealing body 61 to deform. This results in a state in which the opening at the top of the injection container unit 2 is closed and the injection container unit 2 is hermetically closed.

With regard to the supply of air to the sealing body 61, the sealing air supply section 65a includes, in the lid member 60, a port and a pressure gauge (which are not illustrated). The port has a compressed air supply device coupled thereto via a hose, a flowmeter, and a three-way valve. The compressed air supply device is capable of supplying compressed air to the sealing body 61 via the flowmeter, the three-way valve, the hose, and the port. The pressure gauge measures the pressure inside the hollow in the sealing body 61.

The sealing air supply section 65a also includes an air supply control section connected to the pressure gauge, the flowmeter, the three-way valve, and the compressed air supply device. The air supply control section controls the operations of the compressed air supply device and the three-way valve to supply air to the sealing body 61 and stop supplying air to the sealing body 61.

The ejection air supply section 65b supplies air into the injection container unit 2. Specifically, as illustrated in FIG. 6, the ejection air supply section 65b is connected to an introduction tube 67 provided in the lid member 60, and is capable of supplying air into the injection container unit 2 through the introduction tube 67. The ejection air supply section 65b is configured to supply air into the injection container unit 2 while the stopper mechanism 7 (described later) is keeping the ejection ports 20 of the injection container unit 2 open. Meanwhile, the sealing air supply section 65a supplies air to the sealing body 61 to cause the sealing body 61 to inflate. Then, the inflated sealing body 61 hermetically closes the injection container unit 2. While the inflated sealing body 61 is in this state, the ejection air supply section 65b supplies air into the injection container unit 2, and thereby the foamed mixed material is ejected from the injection container unit 2 through the ejection ports 20. The sealing air supply section 65a and the ejection air supply section 65b supply air at different points in time. Note that the sealing air supply section 65a supplies air with a higher pressure than that of air from the ejection air supply section 65b.

The ejection air supply section 65b includes, in the lid member 60, a port and a pressure gauge (which are not illustrated). The port has coupled thereto a compressed air supply device via a hose, a flowmeter, and a three-way valve. The compressed air supply device is capable of supplying compressed air into the injection container unit 2 via the flowmeter, the three-way valve, the hose, and the port. The pressure gauge measures the pressure inside the injection container unit 2.

The ejection air supply section 65b also includes an air supply control section connected to the pressure gauge, the flowmeter, the three-way valve, and the compressed air supply device. The air supply control section controls the operations of the compressed air supply device and the three-way valve.

The vertically driving mechanism 3 is a mechanism to cause the lid member 60 to move up and down along the depth direction of the injection container unit 2. The vertically driving mechanism 3 is capable of causing the injection container unit 2 to move up and down together with the lid member 60, as necessary. Note that the vertically driving mechanism 3 causes the lid member 60 and the stirring mechanism 5 to move up and down always together.

The vertically driving mechanism 3 includes (i) a cylinder 30a and a rod 30b arranged such that their axes are parallel to the direction connecting the top and bottom of the apparatus and (ii) a drive servomotor (not illustrated) for vertical driving. The bottom end of the rod 30b is connected to the lid member 60 and the stirring mechanism 5. With this configuration, when the drive servomotor operates, the lid member 60 and the stirring mechanism 5 move together in a direction toward the bottom of the injection container unit 2 or the opposite direction. In other words, the lid member 60 and the stirring mechanism 5 move along the direction connecting the top and bottom of the apparatus. The drive servomotor is connected to a vertical movement control section (not illustrated).

The connector unit 4 includes one or more container clamping mechanisms 40 which connect and disconnect the vertically driving mechanism 3, the lid member 60, and the stirring mechanism 5 to and from the injection container unit 2. The connection is achieved by the clamping pins 43 of the container clamping mechanisms 40 being inserted into the holes 28a in the clamping bushes 28 connected to the upper flange 27 of the upper unit 22 of the injection container unit 2. Thus, the connector unit 4 is comprised of the container clamping mechanisms 40 and the clamping bushes 28. The connector unit 4 has the lower end of the rod 30b of the vertically driving mechanism 3 connected and fixed to the top thereof. The connector unit 4 includes one or more block-like members 4a in a lower part thereof, and the block-like members 4a have the lid member 60 connected and fixed thereto. As illustrated in FIGS. 3 and 4, the block-like members 4a are located at two positions opposite each other with the stirring shaft 53 of the stirring mechanism 5 between them. The block-like members 4a have the respective container clamping mechanisms 40 connected thereto. The connector unit 4 further includes a container-raising-lowering cable carrier 46 (FIG. 2).

Each container clamping mechanism 40 includes, as illustrated in FIG. 4, (i) a clamping cylinder 44 (driving section) having a rod 41, (ii) a clamping base 42, and (ii) clamping pins 43. The container clamping mechanism 40 is connected to a corresponding block-like member 4a fixed to the lid member 60, and the rod 41 (FIG. 4) is borne in the block-like member 4a. The rod 41 has the clamping base 42 connected to an end thereof, and the clamping base 42 has thereon the clamping pins 43 borne in the block-like member 4a. There are two such clamping bases 42. Each of the two clamping bases 42 is provided with two clamping pins 43 arranged in parallel to each other.

The projecting end of each clamping pin 43 is inserted into a corresponding hole 28a in a corresponding clamping bush 28 connected to the upper flange 27 of the upper unit 22 of the injection container unit 2. The clamping bushes 28 are located at two positions along the circumferential direction of the upper flange 27 so as to correspond to the respective container clamping mechanisms 40. Each of the clamping bushes 28 has two holes 28a.

Figure 5:
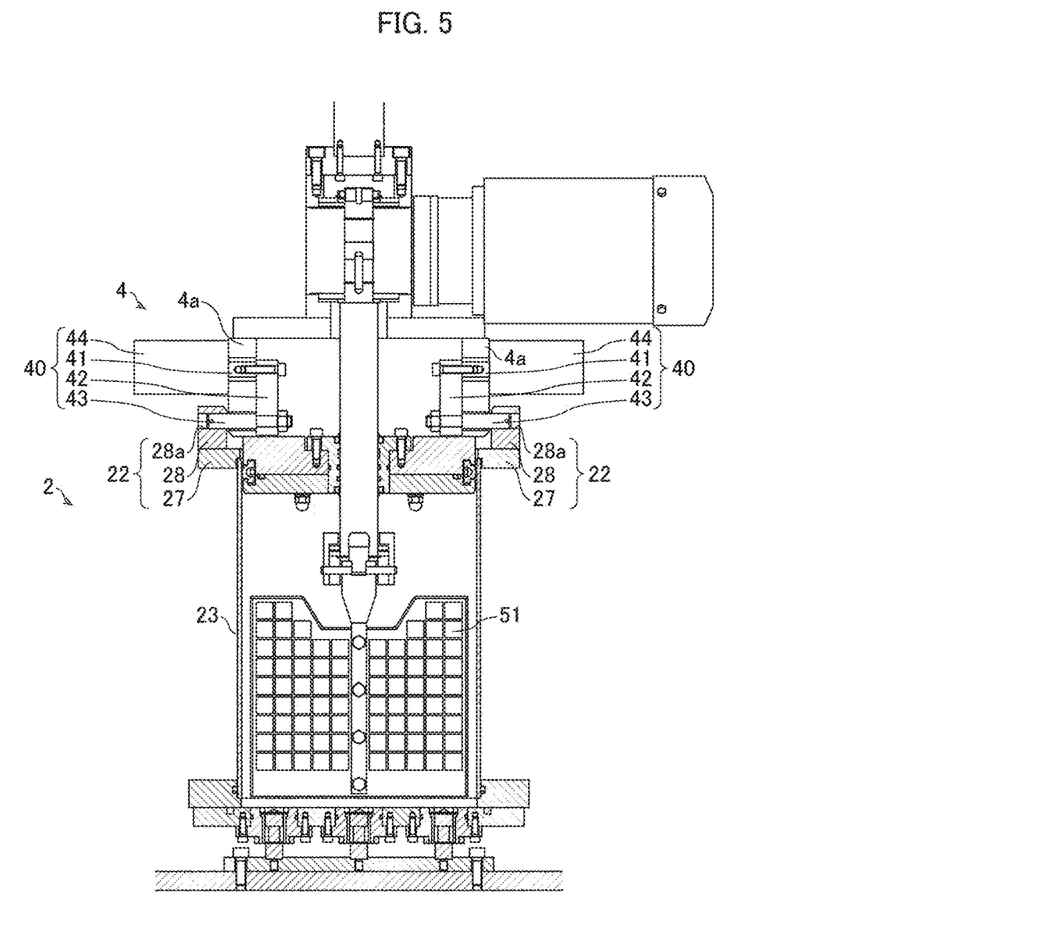
FIG. 5 is a cross-sectional view of the injection container unit and its vicinity of FIG. 4 in which the injection container unit and a lid member are connected together in one unit by a connector unit.

The clamping cylinder 44 is capable of moving the clamping base 42 by moving the rod 41. With this, the clamping pins 43 projecting from the clamping base 42 advance or move back along the direction in which the clamping pins 43 project, and, thereby, the clamping pins 43 are inserted into the holes 28a or removed from the holes 28a (withdrawn from the holes 28a). The clamping cylinder 44 is controlled by a clamping control section (not illustrated) to insert or remove the clamping pins 43 into or from the holes 28a. FIG. 5 illustrates a state in which the clamping pins 43 are inserted in the holes 28a. As illustrated in FIG. 5, the insertion of the clamping pins 43 into the holes 28a makes the injection container unit 2 and the lid member 60 connected together. With this configuration, when the lid member 60 is caused to move up or down by the vertically driving mechanism 3, the injection container unit 2 also moves up or down.

The container-raising-lowering cable carrier 46 illustrated in FIG. 2 has one end thereof connected and fixed to an apparatus frame F and the other end thereof connected and fixed to the connector unit 4. The container-raising-lowering cable carrier 46 supports and guides a cable routed in the molding machine 1. The container-raising-lowering cable carrier 46 expands or retracts vertically as the connector unit 4 is caused to move up or down by the vertically driving mechanism 3.

The stirring mechanism 5 mixes materials supplied to the injection container unit 2. As illustrated in FIG. 4, the stirring mechanism 5 includes a stirring blade 51, a stirring shaft 53, and a stirring motor 55. The stirring shaft 53 is disposed vertically. The stirring blade 51 is provided at the lower end of the stirring shaft 53. The stirring shaft 53 has the stirring motor 55 connected thereto. The stirring motor 55 drives the stirring blade 51 to rotate. The stirring mechanism 5 mixes the materials in the injection container unit 2 with the stirring blade 51. The materials (particulate aggregate, water-soluble binder, surfactant, and water) are introduced into the injection container unit 2 from, for example, a material feeding section 8 including respective supplying mechanisms.

Examples of the materials include artificial sand (e.g., ESPEARL) as particulate aggregate, sodium silicate as a water-soluble binder, an anionic surfactant as a surfactant, and water. The materials are not limited to those listed above as examples, and may include some other additive(s) or the like.

As illustrated in FIG. 4, the stopper mechanism 7 includes one or more stoppers 7a for blocking the ejection ports 20 of the lower unit 21 of the injection container unit 2. The stoppers 7a project upward from the stopper plate 7b, which is disposed horizontally. The stopper mechanism 7 is configured to be caused, by a mechanism (not illustrated), to move sideways in FIG. 2 (horizontally).

The stopper mechanism 7 further includes one or more support parts 7d (FIG. 1) which support the stopper plate 7b. The support parts 7d are supported by the driving mechanism 9, which is connected to the apparatus frame F (FIG. 2) such that the driving mechanism 9 is movable relative to the apparatus frame F.

The driving mechanism 9 serves to cause the stopper mechanism 7 to move horizontally (sideways in FIG. 2), and includes: one or more support guide parts 91 configured to support the support parts 7d of the stopper mechanism 7; and one or more guide rods 92 configured to guide one or more stopper mechanism traveling cylinders (not illustrated). The driving mechanism 9 operates the stopper mechanism traveling cylinders to thereby cause the position of the stopper plate 7b of the stopper mechanism 7 to move horizontally. Specifically, the driving mechanism 9 causes the stopper plate 7b to move between the following locations: (i) a location in which the stoppers 7a are directly below the ejection ports 20 of the injection container unit 2 (such a location of the stopper plate 7b is referred to as "first location"); and (ii) a location in which the stopper plate 7b is not directly below the ejection ports 20 of the injection container unit 2 (such a location of the stopper plate 7b is referred to as "second location"). The second location may be outside the apparatus. The phrase "the stopper plate 7b is not directly below the ejection ports 20 of the injection container unit 2" means that, in the step of injecting the foamed mixed material from the ejection ports 20 of the injection container unit 2 into the mold 11, the stopper plate 7b is so positioned as not to hinder the injection.

The driving mechanism 9 is also capable of causing the injection container unit 2, not in connection with the lid member 60 via the connector unit 4, to move horizontally together with the stopper plate 7b on which the injection container unit 2 resides. While the injection container unit 2 is not in connection with the lid member 60, the injection container unit 2 has the stoppers 7a fitted in the ejection ports 20. This makes it possible to cause the injection container unit 2 to stably reside on the stopper plate 7b, and possible to cause the injection container unit 2, together with the stopper plate 7b on which the injection container unit 2 stably resides, to move out of the position directly below the lid member 60, the stirring mechanism 5, and the like. This makes it possible to carry out a maintenance operation involving cleaning the injection container unit 2 after causing the injection container unit 2 to move to, for example, somewhere outside the apparatus. As compared to a conventional apparatus which includes a driving mechanism specifically for causing an injection container unit to move horizontally, the molding machine 1 is configured to cause the injection container unit 2 to move horizontally with use of a driving mechanism that is configured to cause the stopper mechanism 7 to move sideways in FIG. 2. This makes it possible to simplify the configuration of the molding machine 1 compared to the conventional apparatus. Furthermore, if there are driving mechanisms specifically for respective constituent elements which need to move sideways in FIG. 2, this necessitates a complex control such as controlling relative positions of the driven constituent elements. In contrast, according to the present embodiment, the driving mechanism 9 is used as a driving mechanism for horizontal movements of both the stopper mechanism 7 and the injection container unit 2; therefore, control is easy. Furthermore, according to a conventional molding machine, a maintenance operation requires detaching a heavy injection container unit from the molding machine within a limited space. This results in poor workability, making it very difficult to clean the injection container unit. However, the foregoing configuration makes it possible to more easily carry out an operation of maintenance of the injection container unit than in the case of the conventional apparatus.

The mold 11 is provided below the molding machine 1, as illustrated in (iii) of FIG. 7. The mold 11 is configured to form a mold by molding a foamed mixed material mixed by the stirring mechanism 5 into a predetermined shape. The mold 11 has therein one or more through-holes 11a through which the foamed mixed material is filled into the mold 11 (such holes are hereinafter referred to as "through-holes 11a" for short). The through-holes 11a are to be located in alignment with the ejection ports 20 of the injection container unit 2. The molding machine 1 also includes a mold extruding mechanism (not illustrated) for removing the mold from the mold 11 by opening the mold 11.

(4) How Molding Machine 1 Operates to Form a Mold

The following description will discuss how the molding machine 1 operates. A state in which a foamed mixed material is accommodated in the molding machine 1 is discussed first. The foamed mixed material is not illustrated in FIGS. 7 and 8.

First, (i) of FIG. 7 illustrates a state in which the foamed mixed material is accommodated in the molding machine 1 and the opening at the top of the injection container unit 2 is closed with the lid member 60. The clamping pins 43 are inserted in the holes 28a of the clamping bushes 28, and the lid member 60 and the injection container unit 2 are connected together. The sealing body 61 on the lid member 60 is not hermetically closing the opening at the top of the injection container unit 2. The ejection ports 20 are blocked with the stoppers 7a.

Next, the stoppers 7a, which are blocking the ejection ports 20, are removed. Specifically, the lid member 60 and the injection container unit 2, which are connected together as illustrated in (i) of FIG. 7, ascend and thereby the stoppers 7a are removed from the ejection ports 20. The resulting state is illustrated in (ii) of FIG. 7. In the state illustrated in (ii) of FIG. 7, the stopper mechanism 7 can be moved horizontally and can thereby be withdrawn from the space directly below the injection container unit 2.

Next, an ejection step is carried out. This step involves ejecting the foamed mixed material from the injection container unit 2 having its ejection ports 20 open. Specifically, the stoppers 7a are moved horizontally from the state illustrated in (ii) of FIG. 7, the injection container unit 2 is caused to descend so as to reside on top of the mold 11, and the ejection ports 20 of the injection container unit 2 are placed in alignment with the through-holes 11a of the mold 11. The resulting state is illustrated in (iii) of FIG. 7. In the ejection step, air is supplied from the ejection air supply section 65b into the injection container unit 2. The foamed mixed material in the injection container unit 2 is filled into the cavity of the mold 11 through the ejection ports 20. The mold 11 has been heated by a heating means (not illustrated), and therefore the foamed mixed material in the cavity solidifies with heat.

Note that, before the ejection is carried out, whether the sealing body 61 is properly in close contact with the inner circumferential surface of the injection container unit 2 is determined. That is, whether the opening of the injection container unit 2 is hermetically closed or not is determined. Specifically, the determination is carried out by (i) measuring the pressure of air supplied from the sealing air supply section 65a to the sealing body 61; and (ii) determining whether or not the measured value is equal to or greater than a threshold. If the measured value is equal to or greater than the threshold, this means that the sealing body 61 is properly in close contact with the inner circumferential surface of the injection container unit 2. On the contrary, if the measured value is less than the threshold, this means the likelihood that, for example, air is leaking from the sealing body 61. In a case where the measured value remains less than the threshold for a predetermined period of time from the start of the supply, an error notification is provided. In this case, maintenance is carried out such as a checkup of the sealing body 61 or replacing the sealing body 61 with another one.

Upon completion of the ejection step, the injection container unit 2, the lid member 60, and the stirring mechanism 5 are caused to ascend from the state illustrated in (iii) of FIG. 7 together toward the zenith so that the stoppers can travel below the injection container unit 2. Then, the stopper mechanism 7 moves to the space directly below the injection container unit 2 as illustrated in (ii) of FIG. 7, the injection container unit 2, the lid member 60, and the stirring mechanism 5 are caused to descend, and the stoppers 7a are inserted into the ejection ports 20 as illustrated in (i) of FIG. 7. Once the state illustrated in (i) of FIG. 7 has been reached, the clamping pins 43 are removed from the holes 28a of the clamping bushes 28, and the injection container unit 2 is disconnected from the lid member 60 and the stirring mechanism 5. Meanwhile, the mold 11 is caused to move out of the space directly below the injection container unit 2. This completes a series of operations concerning ejection. Note that the following configuration may be employed: during an injection step, the injection container unit 2, the lid member 60, and the stirring mechanism 5 are caused to ascend together toward the zenith so that the stoppers can travel below the injection container unit 2, while the mold 11 is heated and the foamed mixed material solidifies with heat.

Next, while the injection container unit 2 resides on the stopper plate 7b, the lid member 60 and the stirring mechanism 5 ascend so that materials can be introduced into the injection container unit 2. The resulting state is illustrated in (iv) of FIG. 7. While the molding machine 1 is in this state, a material introducing step is carried out. This step involves introducing particulate aggregate, a water-soluble binder, a surfactant, and water (these are collectively referred to as materials) into the injection container unit 2. The materials are introduced from a material feeding section(s) (not illustrated) through an inlet in the injection container unit 2 or the opening at the top of the injection container unit 2. After the materials are introduced, the weight of the injection container unit 2 having the materials therein is measured in order to control the amounts of the materials introduced. The weight can be measured with a weighing apparatus mounted on the stopper mechanism 7. At this point in time, neither the lid member 60 nor the stirring blade 51 is in contact with the injection container unit 2; therefore, the weight of the injection container unit 2 having the materials therein can be measured accurately.

Next, the lid member 60 and the stirring mechanism 5 are caused to descend toward the injection container unit 2, and a mixing step is carried out. During the mixing step, the positions of the lid member 60 and the stirring mechanism 5 relative to the injection container unit 2 are such that the clamping pins 43 are located lower than the holes 28a of the clamping bushes 28. This state is illustrated in (v) of FIG. 7. In other words, during mixing (while in the state illustrated in (v) of FIG. 7), the stirring blade 51 is located lower than when it was in the original position (see (i) of FIG. 7) and lower than when clamping operation is carried out (i.e., located closer to the bottom of the container).

Next, upon completion of the mixing, the lid member 60 and the stirring mechanism 5 are caused to ascend until the clamping pins 43 become equal in vertical position to the holes 28a of the clamping bushes 28, and the clamping pins 43 are inserted into the holes 28a of the clamping bushes 28. The resulting state is the state illustrated in (i) of FIG. 7.

The molding machine 1 is capable of repeating an operation cycle which includes the above-described ejection, introduction of materials, weighing, and mixing.

Note that, in a case where maintenance is carried out, the cycle is stopped while the molding machine 1 is in the state illustrated in (i) of FIG. 7, the clamping pins 43 are removed from the holes 28a of the clamping bushes 28, and the injection container unit 2 is detached from the lid member 60 and the stirring mechanism 5. This results in a state in which the injection container unit 2 resides on the stopper plate 7b of the stopper mechanism 7. While the molding machine 1 is in this state, the lid member 60 and the stirring mechanism 5 are caused to ascend. Then, the ascending movement is stopped once a connector 52 (at which the stirring shaft 53 and the stirring blade 51 are connected together) has reached a position above the top end of the injection container unit 2 as illustrated in (vi) of FIG. 8 and workspace has been formed around the connector 52.

Figure 8:
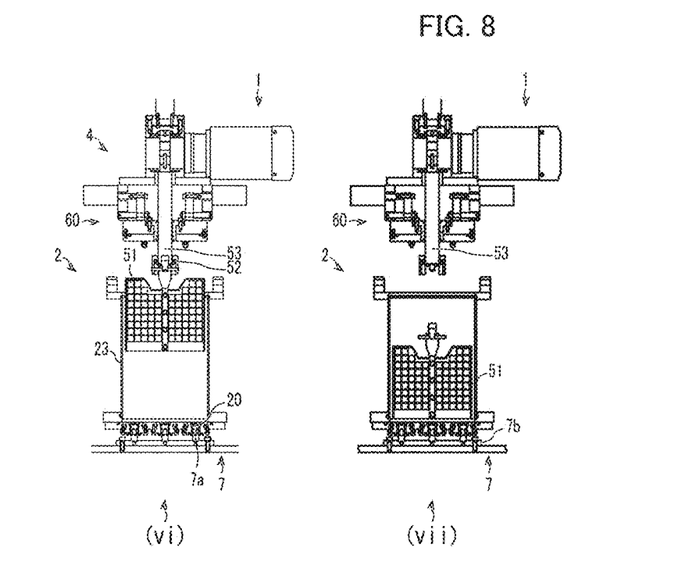
FIG. 8 schematically illustrates another example of how the molding machine illustrated in FIG. 1 operates.

Next, the connector 52 is operated to detach the stirring blade 51 from the stirring shaft 53 as illustrated in (vii) of FIG. 8, and the stirring blade 51 only is accommodated in the injection container unit 2. Since the injection container unit 2 having the stirring blade 51 accommodated therein resides on the stopper plate 7b, the injection container unit 2 can be moved horizontally along with the stopper plate 7b. Maintenance can be carried out, e.g., the injection container unit 2 and the stirring blade 51 can be cleaned, at a position to which the injection container unit 2 has been moved out of the space directly below the connector unit 4. Since the injection container unit 2 is configured to be detached from the lid member 60 and the stirring mechanism 5 as described above, the molding machine 1 dramatically improves maintenance operations. Furthermore, when the stirring blade 51 is configured to be detached as described above, it is not necessary to raise the stirring blade 51 until the bottom end of the stirring blade 51 reaches a position above the top end of the injection container unit 2, making it possible to set the vertical movement range of the stirring mechanism 5 small. It is also possible to reduce the size of the vertically driving mechanism 3.

(5) Effects of the Present Embodiment

The molding machine 1 in accordance with the present embodiment includes: the vertically driving mechanism 3 configured to cause the lid member 60 to move up and down along the depth direction of the injection container unit 2; and the connector unit 4 capable of connecting the injection container unit 2 and the lid member 60 into one unit and disconnecting the injection container unit 2 and the lid member 60. With this configuration, in a case where the injection container unit 2 needs to be moved up or down, the molding machine 1 is capable of causing the injection container unit 2 to move up or down with use of the vertically driving mechanism 3 by connecting the injection container unit 2 with the lid member 60 by the connector unit 4. That is, the molding machine 1 eliminates the need for a vertically driving mechanism specifically for the injection container unit 2. This makes it possible to simplify the configuration of the molding machine 1. In addition, in a case where there are driving mechanisms for vertical movements specifically for respective constituent elements which need to be moved up and down, such vertical movements should be carried out in consideration of the relative positions of the constituent elements. This necessitates a complex control such as controlling the relative positions of the driven constituent elements. In this regard, in the present embodiment, the vertically driving mechanism 3 is used as a driving mechanism for vertical movements of both the lid member 60 and the injection container unit 2; therefore, the risk of interference is eliminated. It is also possible to shorten the cycle time.

Aspects of the present invention can also be expressed as follows:

A molding machine in accordance with Aspect 1 of the present invention includes: an injection container unit configured such that a foamed mixed material is injected from the injection container unit into a cavity of a mold through an ejection port; a lid member configured to open and close an opening at a top of the injection container unit; a vertically driving mechanism configured to cause the lid member to move up and down along a depth direction of the injection container unit; and a connector unit configured to disconnectably connect the injection container unit and the lid member.

With the above configuration, it is not necessary for the molding machine in accordance with an embodiment of the present invention to include a driving mechanism specifically for vertical movement of the injection container unit. This makes it possible to achieve a molding machine having a simpler configuration than conventional molding machines. In a case where the injection container unit and the lid member are connected together in one unit by the connector unit, the vertically driving mechanism is capable of causing the injection container unit to move up or down together with the lid member. On the contrary, in a case where the injection container unit and the lid member are disconnected from each other, the vertically driving mechanism is capable of causing the lid member to move up or down without causing the injection container unit to move up or down. That is, in a case where the injection container unit needs to be moved up or down, the injection container unit is connected to the lid member by the connector unit.

Furthermore, with the above configuration, the vertically driving mechanism is used as a driving mechanism for vertical movements of both the lid member and the injection container unit. This achieves easy control, and makes it possible to reduce cycle time (time from the start of mixing to the end of ejection) compared to conventional molding machines.

In Aspect 2 of the present invention, the molding machine of Aspect 1 may further include a stirring mechanism configured to stir the foamed mixed material in the injection container unit, and may be arranged such that the vertically driving mechanism is configured to cause the lid member and the stirring mechanism to move up and down along the depth direction.

With the above configuration, the stirring mechanism is caused by the vertically driving mechanism to move up and down. This eliminates the need for a driving mechanism specifically for vertical movement of the stirring mechanism, and thus makes it possible to achieve a molding machine having a simple configuration.

In Aspect 3 of the present invention, the molding machine of Aspect 1 or 2 may be arranged such that the connector unit includes: a clamping pin; a clamping bush configured to be positioned on the injection container unit; and a driving section configured to drive the clamping pin.

With the above configuration, the lid member and the injection container unit can be easily connected together by clamping, and the lid member and the injection container unit can be easily disconnected from each other.

In Aspect 4 of the present invention, the molding machine of any of Aspects 1 to 3 may further include: a stopper plate which includes a stopper configured to open and close the ejection port; and a driving mechanism configured to cause the stopper plate to move horizontally, and may be arranged such that the injection container unit is configured such that, while the injection container unit and the lid member are not connected together by the connector unit, the injection container unit resides on the stopper plate and is capable of moving horizontally as the stopper plate is caused to move by the driving mechanism.

With the above configuration, the injection container unit is caused to move horizontally by a driving mechanism that is configured to cause the stopper plate to move horizontally. According to a conventional molding machine, a maintenance operation requires detaching a heavy injection container unit from the molding machine within a limited space. This results in poor workability, making it very difficult to clean the injection container unit. However, the molding machine in accordance with an embodiment of the present invention makes it possible to more easily carry out an operation of maintenance of the injection container unit than in the case of the conventional apparatus.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1 molding machine
2 injection container unit
3 vertically driving mechanism
4 connector unit
5 stirring mechanism
7a stopper
7b stopper plate
9 driving mechanism
11 mold
20 ejection port
27a opening (opening at the top)
28 clamping bush
43 clamping pin
44 clamping cylinder (driving section)
60 lid member

The invention claimed is:

1. A molding machine comprising:
an injection container unit configured such that a foamed mixed material is injected from the injection container unit into a cavity of a mold through an ejection port;
a lid member configured to open and close an opening at a top of the injection container unit;
a vertically driving mechanism configured to cause the lid member to move up and down along a depth direction of the injection container unit; and
a connector unit configured to disconnectably connect the injection container unit and the lid member, wherein
in a case where the injection container unit and the lid member are connected together in one unit by the connector unit, the vertically driving mechanism causing the injection container unit to move up or down together with the lid member, and
in a case where the injection container unit and the lid member are not connected together by the connector unit, the vertically driving mechanism causing the lid member to move up or down without causing the injection container unit to move up or down.

2. The molding machine according to claim 1, further comprising a stirring mechanism configured to stir the foamed mixed material in the injection container unit,
wherein the vertically driving mechanism is configured to cause the lid member and the stirring mechanism to move up and down along the depth direction.

3. The molding machine according to claim 1, wherein the connector unit includes:
a clamping pin;
a clamping bush configured to be positioned on the injection container unit; and
a driving section configured to drive the clamping pin.

4. The molding machine according to claim 1, further comprising:
a stopper plate which includes a stopper configured to open and close the ejection port; and
a driving mechanism configured to cause the stopper plate to move horizontally,
wherein the injection container unit is configured such that, while the injection container unit and the lid member are not connected together by the connector unit, the injection container unit resides on the stopper plate and is capable of moving horizontally as the stopper plate is caused to move by the driving mechanism.

* * * * *